(12) United States Patent
Mendes et al.

(10) Patent No.: US 11,269,515 B2
(45) Date of Patent: Mar. 8, 2022

(54) SECURE AUTHENTICATION FOR DEBUGGING DATA TRANSFERRED OVER A SYSTEM MANAGEMENT BUS

(71) Applicant: Micron Technology, Inc., Boise, ID (US)

(72) Inventors: Joe Mendes, Santa Cruz, CA (US); Chandra M. Guda, Fremont, CA (US); Steven Gaskill, Campbell, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 15/929,659

(22) Filed: May 14, 2020

(65) Prior Publication Data
US 2021/0357125 A1    Nov. 18, 2021

(51) Int. Cl.
*G06F 3/06* (2006.01)
*G06F 13/40* (2006.01)

(52) U.S. Cl.
CPC .......... *G06F 3/0607* (2013.01); *G06F 3/0653* (2013.01); *G06F 3/0679* (2013.01); *G06F 13/4004* (2013.01)

(58) Field of Classification Search
CPC .... G06F 3/0607; G06F 3/0653; G06F 3/0679; G06F 13/4004
See application file for complete search history.

(56) References Cited

U.S. PATENT DOCUMENTS

| | | | |
|---|---|---|---|
| 5,636,342 A | 6/1997 | Jeffries | |
| 6,728,793 B1 | 4/2004 | McRobert et al. | |
| 7,730,545 B2 * | 6/2010 | Milne | G06F 21/35 726/27 |
| 2005/0044457 A1 | 2/2005 | Jeddeloh | |
| 2007/0168746 A1 | 7/2007 | Righi et al. | |
| 2007/0294436 A1 | 12/2007 | Chen et al. | |
| 2013/0275647 A1 | 10/2013 | Bradley | |
| 2015/0074304 A1 | 3/2015 | Adkins et al. | |
| 2016/0358668 A1 | 12/2016 | Hong et al. | |
| 2017/0083393 A1 | 3/2017 | Datta et al. | |
| 2019/0180010 A1 | 6/2019 | Ryu | |
| 2019/0227907 A1 | 7/2019 | Kim | |

OTHER PUBLICATIONS

Fan, Roger, "SMBus Quick Start Guide", Freescale Semiconductor, Doucment No. AN4471, Rev. 1, Aug. 2012, 16 pages.
"System Management Bus (SMBus) Specification", System Management Interface Forum, Inc. Version 3.1, Mar. 19, 2018, 85 pages.

* cited by examiner

*Primary Examiner* — Tammara R Peyton
(74) *Attorney, Agent, or Firm* — Lowenstein Sandler LLP

(57) ABSTRACT

A processing device in a memory system receives a privilege key from a host system, the privilege key having an associated level of access to debug information associated with the memory device and determines the level of access associated with the privilege key. The processing device receives, from the host system, a request for debug information directed to a debug slave address associated with a system management bus port of a memory sub-system, identifies the debug information corresponding to the level of access associated with the privilege key, and sends the debug information to the host system over a system management bus coupled to the system management bus port of the memory sub-system.

20 Claims, 9 Drawing Sheets

SECURE AUTHENTICATION FOR DEBUGGING DATA TRANSFERRED OVER A SYSTEM MANAGEMENT BUS

TECHNICAL FIELD

Embodiments of the disclosure relate generally to memory sub-systems, and more specifically, relate to secure authentication for debugging data transferred over a system management bus.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
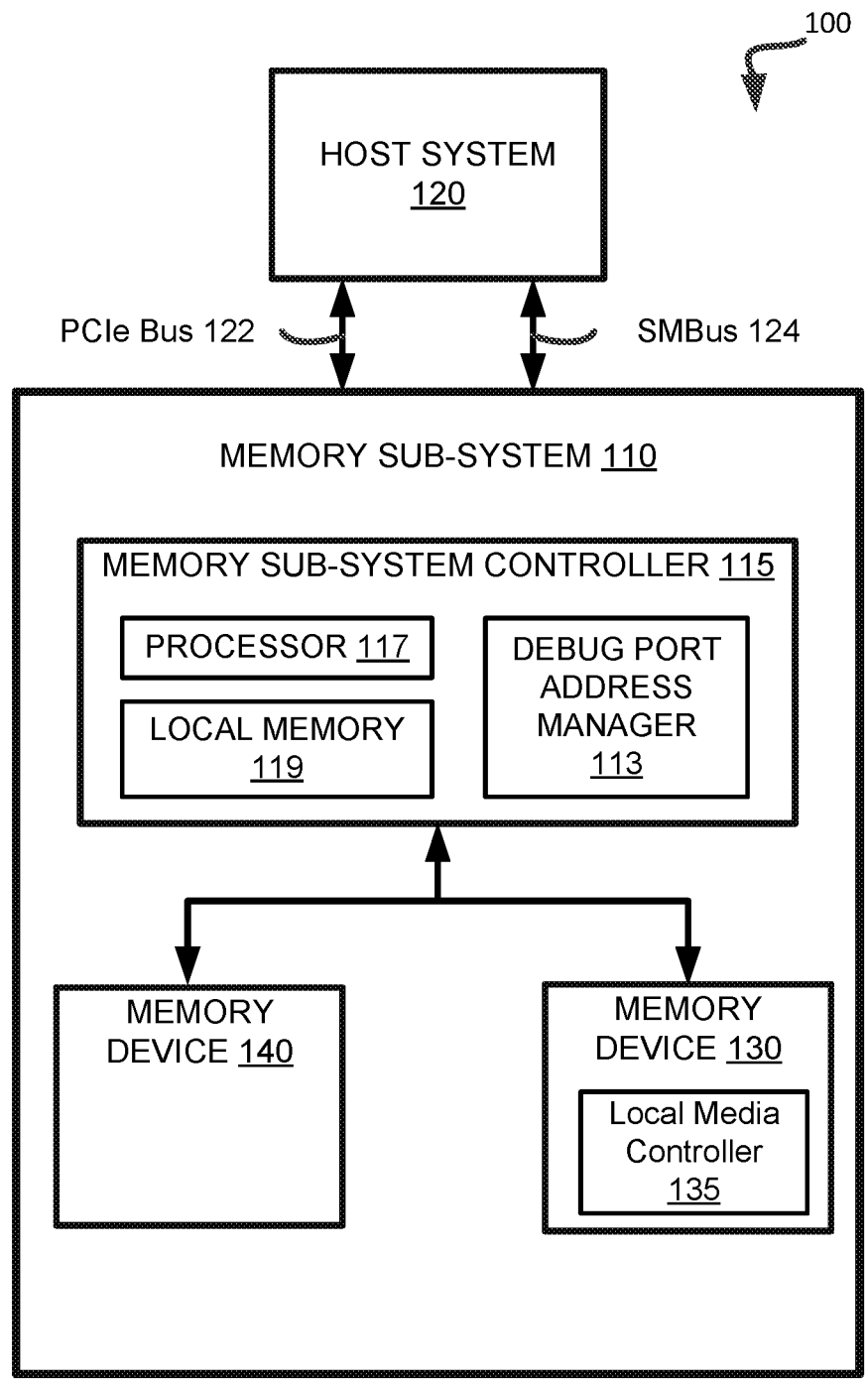
FIG. 1 illustrates an example computing system that includes a memory sub-system in accordance with some embodiments of the present disclosure.

Aspects of the present disclosure are directed to debugging a memory sub-system and secure authentication for debugging data transferred over a system management bus. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

Debugging is a methodical process of finding and reducing the number of defects (i.e., "bugs") in an electronic device, such as a memory sub-system. Various debug techniques can be used to detect anomalies, assess their impact, and schedule hardware changes, firmware upgrades or full updates to a system. The goals of debugging include identifying and fixing bugs in the system (e.g., logical or synchronization problems in the firmware, or a design error in the hardware) and collecting system state information, such as information about the operation of the memory sub-system, that may then be used to analyze the memory sub-system to find ways to boost its performance or to optimize other important characteristics. One example of system state information can include event data generated in the memory sub-system. An event, as used herein, generally refers to a detectable action performed by hardware, software, firmware, or a combination of any of the above in the memory sub-system. Some examples of an event include a memory sub-system controller sending and/or receiving data or accessing a memory location of a memory device, a warning related to some reliability statistic (e.g., raw bit error rate (RBER)) of a memory device, an error experienced by the memory sub-system controller in reading data from or writing data to a memory device, etc.

In many conventional systems, debugging operations or other analyses of the memory sub-system are performed on a separate computing device, such as a host computing system, communicably coupled to the memory sub-system through a communication pipe. The communication pipe can be implemented using any one of various technologies, and can include, for example, a peripheral component interconnect express (PCIe) bus, or some other type of communication mechanism. When performing debugging operations, these conventional systems transfer debugging information, such as system state information, statistics, runtime analytics, etc. from the memory sub-system to the host system over the PCIe bus. In order to transfer the debugging information over the PCIe bus, the data must be formatted according to a specific specification, such as the NVM Express (NVMe) specification. In addition, the transfer of the debugging information utilizes bandwidth of the PCIe bus, which then cannot be used for other memory sub-system and host operations. Other conventional systems can transfer the debugging information using a universal asynchronous receiver-transmitter (UART) bus to a debugging system from the separate host system. This option, however, requires direct access to the memory devices of the memory sub-system, which can be difficult depending on the placement of the memory sub-system. In addition, the speed of the UART bus might be insufficient in order execute runtime analytics in a timely manner.

Aspects of the present disclosure address the above and other deficiencies by debugging a memory sub-system with data transferred from the memory sub-system to an associated host system over a system management bus (SMBus). In one embodiment, the SMBus forms another communication pipe between the host system and the memory sub-system, in addition to the PCIe bus. The SMBus can carry separate data traffic than the PCIe bus, and can be formatted differently as well (e.g., using a defined SMBus protocol or a format defined in the inter-integrated circuit (I2C) specification). While generally used to transfer data pertaining to health or diagnostics of the memory sub-system, in one embodiment, the SMBus can be repurposed to transfer debugging information to the host system. In one embodiment, a designated slave address for debugging information is established on a SMBus port of the memory sub-system. With this address, the host system can issue firmware or hardware debug print events (i.e., requests to pull debugging information) to the memory sub-system. In response, the memory sub-system can provide a response including the requested debugging information sent to the host system over the SMBus. The debugging information can include, for example, system state information, statistics, runtime analytics, etc. In another embodiment, the memory sub-system can periodically, or in response to the occurrence of an event, provide the debugging information to the host system over the SMBus without being prompted by the host system (i.e., providing the information as part of a push operation). In one embodiment, the memory sub-system utilizes a secure authentication system to ensure that only authorized entities are granted access to the relevant debugging information. For example, the host system can be provided with a privilege key to be included with any requests for debugging information. Upon receiving such a request, the memory sub-system can authenticate the requesting host system, determine the appropriate type/level/amount of debugging information to be provided to the host system (e.g., dependent upon a level of access associated with the privilege key, and provide the corresponding debugging information to the host system. Upon receiving the debugging information, the host system can perform debugging operations or other analyses of the memory sub-system.

By utilizing the SMBus to transfer the debugging information, debugging operations and general operation of the memory sub-system can be improved. Bandwidth in the primary communication pipe (i.e., the PCIe bus) need not be utilized for the transfer of debugging information and can be preserved allowing other traffic, including host system commands, memory sub-system data, etc. to be transferred without unnecessary delay. In addition, physical access to the memory sub-system, such as in order to connect a UART bus, is not required, since the existing connection via the SMBus can be used to transfer debugging information to the host system.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface 122. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface 122 can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface 122 (e.g., PCIe bus). The physical host interface 122 can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

In one embodiment, the memory sub-system 110 includes a debug port address manager component 113 that coordinates the transfer of debugging information from memory sub-system 110 to host system 120 over a communication pipe separate from PCIe bus 122. In one embodiment, that communication pipe is SMBus 124. SMBus 124 can carry separate data traffic than the PCIe bus 122, and such data can be formatted using a defined SMBus protocol or a format defined in the I2C specification. In one embodiment, debug port address manager 113 establishes a designated slave address for debugging information a SMBus port corresponding to SMBus 124 in memory sub-system 110. Debug port address manager 113 can receive firmware or hardware debug print events (i.e., requests to pull debugging information) from host system 120 that are directed to the designated slave address for debugging information. In response, debug port address manager 113 can provide a response including the requested debugging information which is sent to host system 120 over SMBus 124. The debugging information can include, for example, system state information, statistics, runtime analytics, etc. In another embodiment, debug port address manager 113 can periodically, or in response to the occurrence of an event, provide the debugging information to host system 120 over SMBus 124 without being prompted by the host system 120 (i.e., providing the information as part of a push operation). Further details with regards to the operations of the debug port address manager 113 are described below.

In some embodiments, the memory sub-system controller 115 includes at least a portion of the debug port address manager component 113. For example, the memory sub-system controller 115 can include a processor 117 (processing device) configured to execute instructions stored in local memory 119 for performing the operations described herein. In some embodiments, the debug port address manager component 113 is part of the host system 110, an application, or an operating system.

Figure 2:
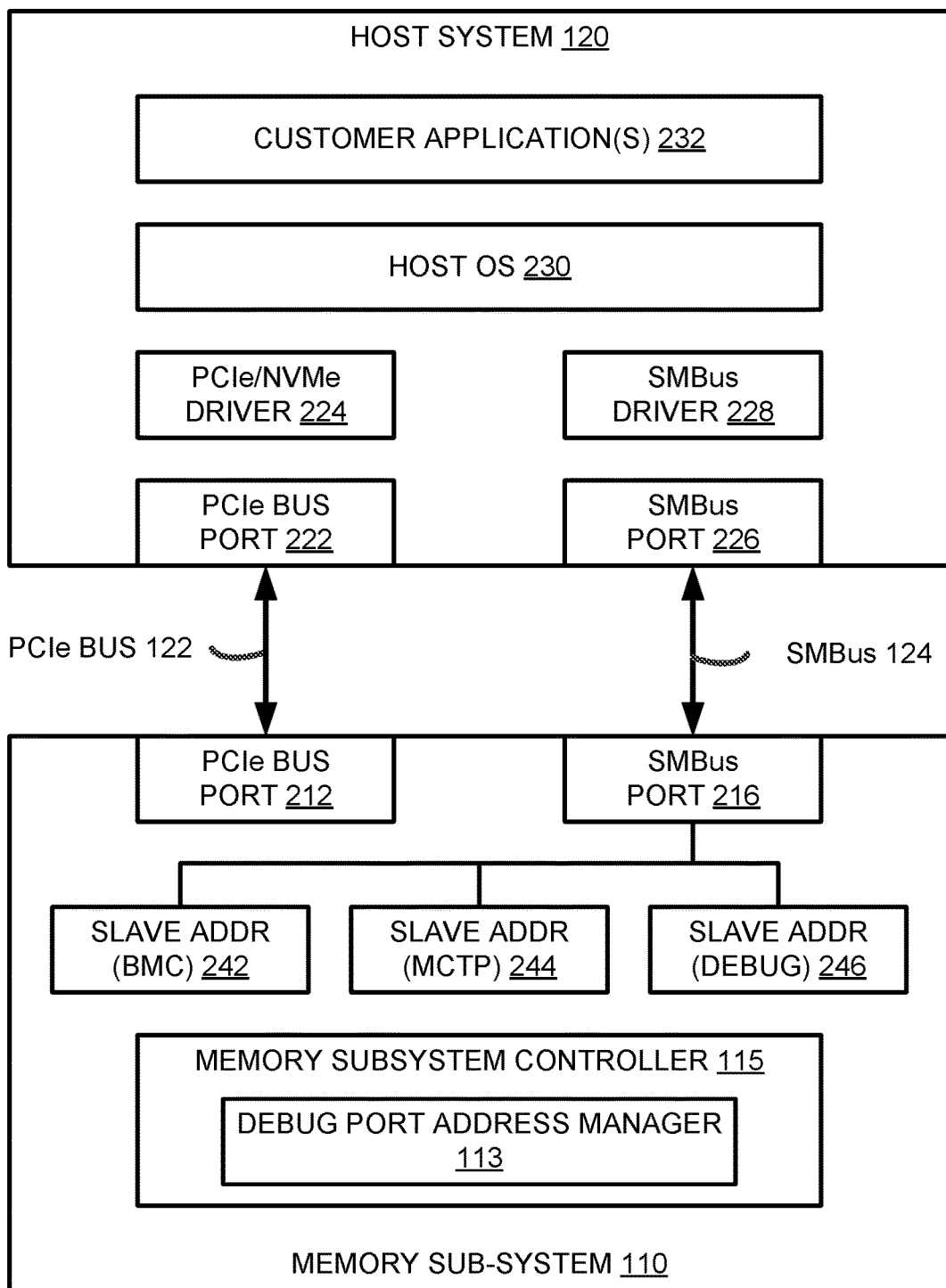
FIG. 2 is a block diagram illustrating a computing system for debugging a memory sub-system with data transfer over a system management bus.

FIG. 2 is a block diagram illustrating a computing system for debugging a memory sub-system with data transfer over a system management bus. In one embodiment, host system 120 is coupled to memory sub-system 110 via PCIe bus 122 and SMBus 124. Host system 120 includes PCIe bus port 222 to which PCIe bus 122 is coupled and which is controlled by PCIe/NVMe driver 224. Host system 120 further includes SMBus bus port 226 to which SMBus 124 is coupled and which is controlled by SMBus driver 228. PCIe/NVMe driver 224 and SMBus driver 228 can provide programming interfaces to control and manage the corresponding ports. A host operating system 230 running on host system 120 or one or more customer applications 232 running on top of host operating system 230 can access the hardware functions of PCIe bus port 222 and SMBus bus port 226 (e.g., to send and receive data) via PCIe/NVMe driver 224 and SMBus driver 228, respectively. For example, host operating system 230 or customer applications 232 can invoke a routine in either PCIe/NVMe driver 224 or SMBus driver 228, which in turn can issue a corresponding command or commands to the associated port. In one embodiment, host system 120 runs multiple virtual machines, by executing a software layer, often referred to as "hypervisor," above the hardware and below the virtual machines, and host operating systems 230 and/or customer applications 232 can be running on these virtual machines.

In one embodiment, memory sub-system 110 includes PCIe bus port 212 to which PCIe bus 122 is coupled and SMBus bus port 216 to which SMBus 124 is coupled. As in host system 120, PCIe bus port 212 and SMBus bus port 216 in memory sub-system 110 can be controlled by corresponding device drivers (not shown). In one embodiment, debug port address manager 113 defines a number of dedicated slave addresses 242, 244, 246 (e.g., according to the I2C specification) associated with SMBus port 216. Each of the slave addresses can be separately addressed by host system 120 for different data and/or requests sent over SMBus 124. For example, slave address 242 can be dedicated for use with basic management command (BMC). In one embodiment, host system 120 can poll memory sub-system 110 for basic health status information using BMC sent over SMBus 124 and addressed to slave address 242. The BMC does not provide any mechanism for modifying or configuring memory sub-system 110 as they do not utilize management component transport protocol (MCTP) messaging. Rather, a separate slave address 244 can be provided for MCTP messages. In one embodiment, host system 120 can send MCTP messages over SMBus 124 and addressed to slave address 244. Slave address 246 can be reserved for transferring debug information from memory sub-system 110 to host system 120 over SMBus 124. In one embodiment, host system 120 can send requests for debug information over SMBus 124 and addressed to slave address 246, and memory sub-system 110 can send the debug information to host system 120 from slave address 246 over SMBus 124. In this manner different types of messages can be sent over SMBus 124 to a single SMBus port 216, and debug port address manager 113 can differentiate the types of messages based on the one dedicated slave addresses 242, 244, 246 to which each of the messages is directed.

Figure 3:
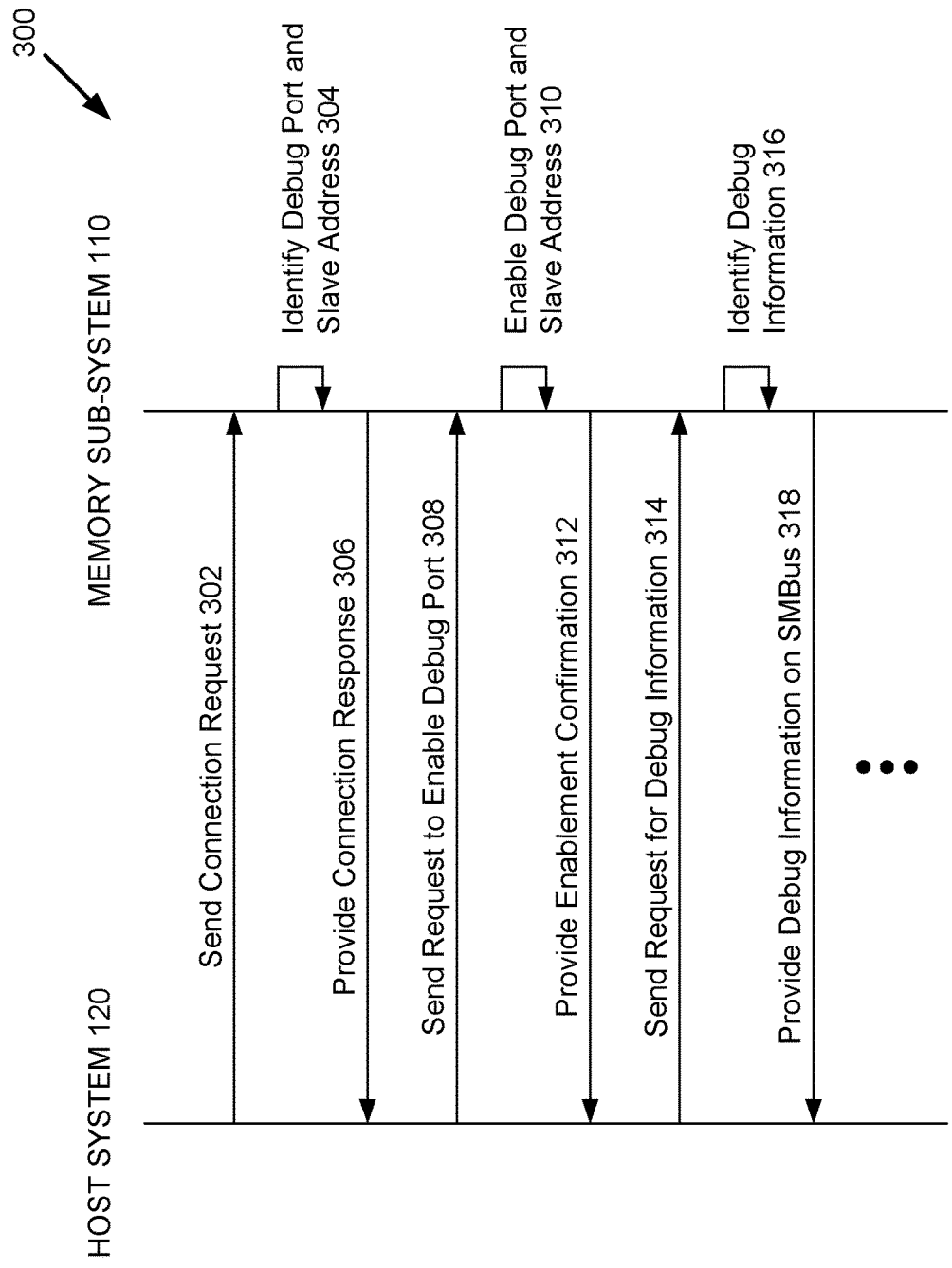
FIG. 3 is a sequence diagram illustrating debugging a memory sub-system with data transfer over a system management bus in accordance with some embodiments of the present disclosure.

FIG. 3 is a sequence diagram illustrating debugging a memory sub-system with data transfer over a system management bus in accordance with some embodiments of the present disclosure. The sequence diagram 300 illustrates one embodiment of the data exchange procedure performed between memory sub-system 110 and host system 120. At operation 302, host system 120 sends a connection request to memory sub-system 110, including a request for a debug slave address 246 associated with SMBus port 216 of memory sub-system 110. In one embodiment, host system 120 sends a vendor specific command to memory sub-system 110 to request the debug slave address 246. Depending on the embodiment, this vendor specific command can be sent over PCIe bus 122, SMBus 124, or any other communication path coupling host system 120 to memory sub-system 110. At operation 304, memory sub-system 110 identifies the SMBus port 216 and corresponding debug slave address 246. Debug slave address 246 can be one of multiple slave address associated with SMBus port 216, and can be dedicated for use in transferring debug information to host system 120. In one embodiment, debug slave address 246 is a static (i.e., default) address defined by debug port address manager 113 of memory sub-system 110. In another embodiment, however, host system 120 can provide a suggested address along with the connection request indicating what address host system 120 would like to use for transfer of debug information. This suggested address can be within a range of available slave addresses provided by memory sub-system 110. At operation 306, memory sub-system 110 provides a connection response including the identified debug slave address 246. In one embodiment, the connection response includes an indication of debug slave address 246 so that host system 120 will have the address available and can direct requests for debug information to that address. Debug port address manager 113 can recognize requests directed to the identified debug slave address 246 as requests for debug information and can distinguish those requests from others received over SMBus 124 and received at SMBus port 216. Depending on the embodiment, the connection response can be sent over PCIe bus 122, SMBus 124, or any other communication path coupling host system 120 to memory sub-system 110.

At operation 308, host system 120 sends a request to enable SMBus port 216 to receive a request for debug information directed to the debug slave address 246. In one embodiment, host system 120 sends a vendor specific command to memory sub-system 110 to request that debug slave address 246 be enabled (e.g., initialized). Depending on the embodiment, this vendor specific command can be sent over PCIe bus 122, SMBus 124, or any other communication path coupling host system 120 to memory sub-system 110. At operation 310, memory sub-system 110 enables SMBus port 216 to receive the request for debug information directed to the debug slave address 246. In one embodiment, in order to enable SMBus port 216 to receive the request for debug information, memory sub-system can stores the debug slave address 246 in a slave address register associated with SMBus port 216. Debug slave address 246 can be one of several slave addresses found in the register, the presence of each of which indicates that those slave addresses are enabled to receive messages, commands, or other data sent over SMBus 124 to SMBus port 216. At operation 312, memory sub-system 110 provides a confirmation of the enabling. The confirmation indicates to host system 120 that the debug slave address 246 was successfully enabled so that host system 120 can knowingly send requests for debug information directed to the debug slave address 246 over SMBus 124.

At operation 314, host system 120 sends a request for debug information directed to the debug slave address 246. In one embodiment, host system 120 sends the request over SMBus 124 and directed to debug slave address 246. The request is received at SMBus port 216, and debug port address manager 113 can identify the request as a request for debug information on the basis of it being directed to debug slave address 246. Depending on the embodiment, the request can be a request for one or more specific types of debug information, or can be more generally for any debug information that is available from memory sub-system 110. At operation 316, memory sub-system 110 identifies the requested debug information. Depending on the implementation, the debug information can include runtime analytics, system state information, health statistics, or other information pertaining to the memory sub-system 110. In one embodiment, debug port address manager 113 monitors operations of memory sub-system 110 and records the metadata in a corresponding data store. In another embodiment, debug port address manager 113 retrieves the requested debug information from the data store, where it was previously recorded by the same or some other component of memory sub-system 110. If the request received at operation 314 specifies a particular piece or type of debug information, debug port address manager 113 can identify the corresponding piece or type. If the request is not specific, debug port address manager 113 can identify all available debug information, or can identify a subset of the available debug information based on a context of the request (e.g., severity of an event entry in the debug information, a priority level of the debug information, a an amount of bandwidth available in SMBus 124, the time of the request, the source of the request). At operation 318, memory sub-system 110 sends the debug information to host system 120 over SMBus 124 coupled to the SMBus port 216 of the memory sub-system 110. By utilizing SMBus 124 to transfer the debugging information, bandwidth in the PCIe bus 122 is conserved and physical access to the memory sub-system 110, such as in order to connect a UART bus, is not required, since the connection to host system 12 via the SMBus 124 is already existing. In one embodiment, additional requests for debug information can be received and the requested debug information can be provided to host system 120 via SMBus 124 as long as the debug slave address 246 remains enabled.

Figure 4:
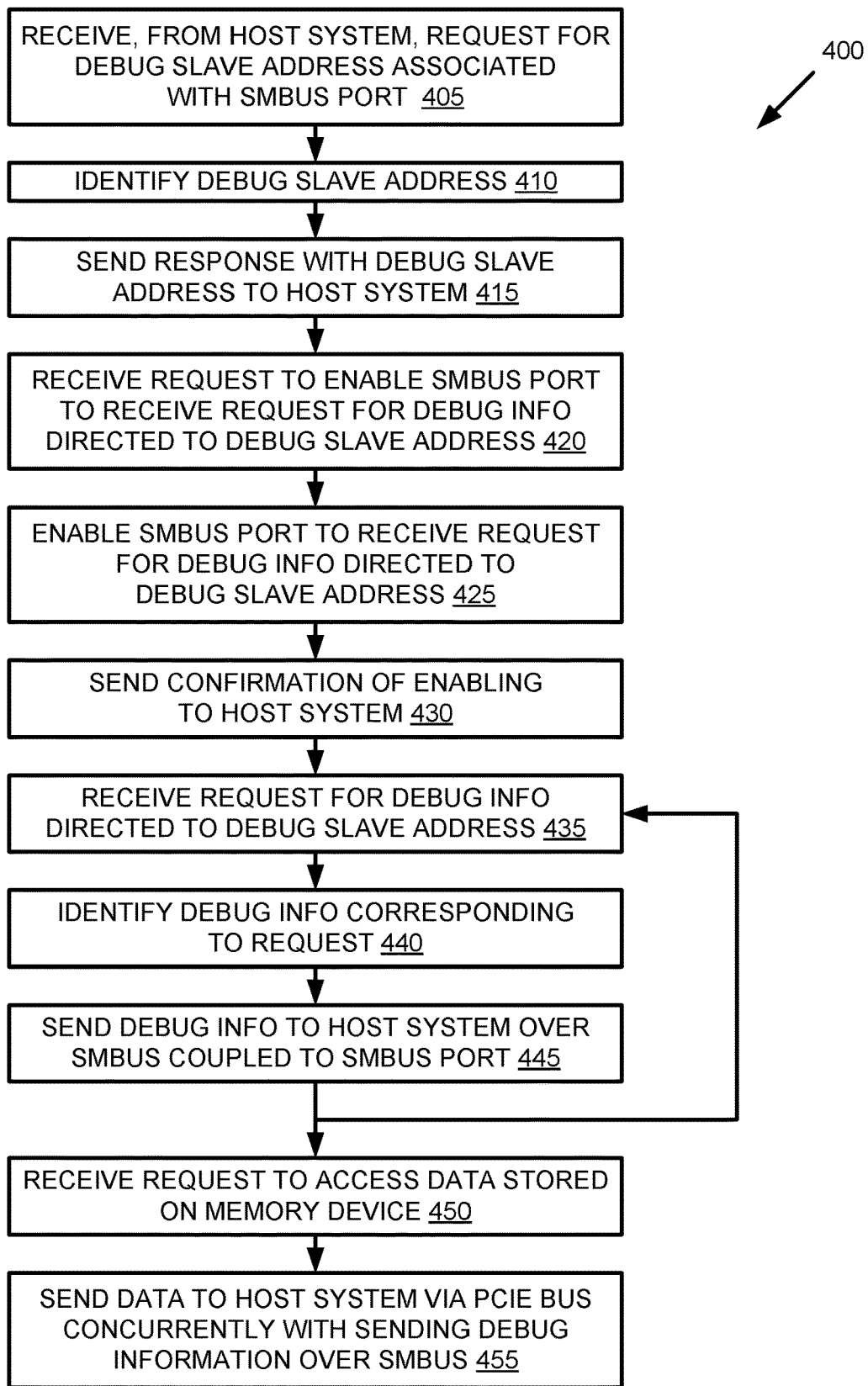
FIG. 4 is a flow diagram of an example method of debugging a memory sub-system with data transfer over a system management bus in accordance with some embodiments of the present disclosure.

FIG. 4 is a flow diagram of an example method of debugging a memory sub-system with data transfer over a system management bus in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by debug port address manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing logic receives, from host system 120, a request for a debug slave address 246 associated with SMBus port 216 of a memory sub-system 110. In one embodiment, memory sub-system 110 receives a vendor specific command sent from host system 120 requesting the debug slave address 246. Depending on the embodiment, this vendor specific command can be received over PCIe bus 122, SMBus 124, or any other communication path between host system 120 to memory sub-system 110.

At operation 410, the processing logic identifies the debug slave address 246 associated with SMBus port 216 responsive to receiving the request for the debug slave address. Debug slave address 246 can be one of multiple slave address 242, 244, 246 associated with SMBus port 216, and can be dedicated for use in transferring debug information to host system 120. In one embodiment, debug slave address 246 has a default address specified by the memory sub-system 110. In another embodiment, debug slave address 246 is a suggested slave address specified by host system 120 in the request for the debug slave address, and wherein the suggested slave address is within a range of available addresses provided by the memory sub-system 110.

At operation 415, the processing logic sends a response indicating the debug slave address 246 to the host system 120. In one embodiment, the response includes an indication of debug slave address 246 so that host system 120 can direct requests for debug information to that address. Debug port address manager 113 can recognize requests directed to the identified debug slave address 246 as requests for debug information and can distinguish those requests from other requests received over SMBus 124 and received at SMBus port 216. Depending on the embodiment, the response can be sent over PCIe bus 122, SMBus 124, or any other communication path between host system 120 to memory sub-system 110.

At operation 420, the processing logic receives, from host system 120, a request to enable SMBus port 216 to receive a request for debug information directed to the debug slave address 246. In one embodiment, memory sub-system 110 receives a vendor specific command from host system 120 requesting that debug slave address 246 be enabled (e.g., initialized). Depending on the embodiment, this vendor specific command can be received over PCIe bus 122, SMBus 124, or any other communication path between host system 120 to memory sub-system 110.

At operation 425, the processing logic enables SMBus port 216 to receive the request for debug information directed to the debug slave address 246 responsive to the request to enable the SMBus port 216. In one embodiment, in order to enable SMBus port 216 to receive the request for debug information, debug port address manager 113 can stores the debug slave address 246 in a slave address register associated with SMBus port 216. In one embodiment, the slave address register is stored in local memory 119 of memory sub-system controller 115.

At operation 430, the processing logic sends confirmation of the enabling to host system 120. The confirmation indicates to host system 120 that the debug slave address 246 was successfully enabled so that host system 120. Knowing that the debug slave address 246 is enabled allows host system 120 to send requests for debug information directed to the debug slave address 246 over SMBus 124.

At operation 435, the processing logic receives, from host system 120, the request for debug information directed to the debug slave address 246. In one embodiment, memory sub-system 110 receives the request from host system over SMBus 124. The request is received at SMBus port 216, and debug port address manager 113 can identify the request as a request for debug information on the basis of it being directed to debug slave address 246 rather than one of the other slave addresses associated with SMBus port 216. In one embodiment, the request is for one or more specific types of debug information. In another embodiment, the request is for any debug information that is available from memory sub-system 110.

At operation 440, the processing logic identifies the debug information corresponding to the request. Depending on the implementation, the debug information can include runtime analytics, system state information, health statistics, or other information pertaining to the memory sub-system 110. At operation 445, the processing logic sends the debug information to host system 120 over SMBus 124 coupled to SMBus port 216 of the memory sub-system 110. In one embodiment, additional requests for debug information can be received and the requested debug information can be provided to host system 120 via SMBus 124 as long as the debug slave address 246 remains enabled. Thus, processing can optionally return to operation 435 and operations 435, 440, and 445 can be repeated multiple times.

At operation 450, the processing logic receives, via PCIe bus 122 coupled between PCIe bus port 212 of memory sub-system 110 and host system 120, one or more requests to access data stored on a memory device, such as memory device 130, of the memory sub-system 110. For example, the requests can include a request to read data from memory device 130, write data to memory device 130, erase data from memory device 130, etc. At operation 455, the processing logic sends the requested data to host system 120 via the PCIe bus 122 concurrently with sending the debug information to host system 120 over the SMBus 124. By utilizing SMBus 124 to transfer the debugging information, bandwidth in the PCIe bus 122 is preserved for other operations.

Figure 5:
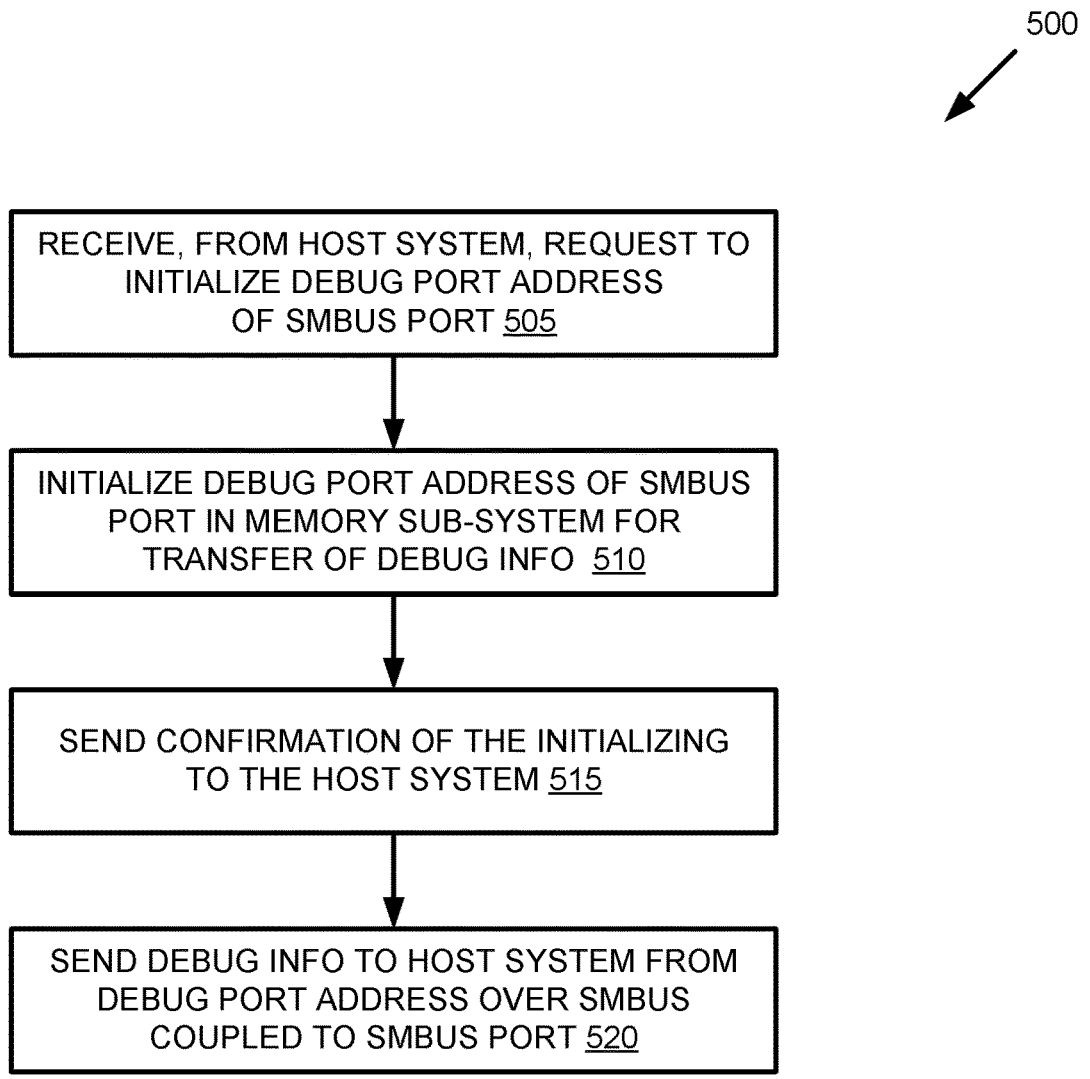
FIG. 5 is a flow diagram of an example method of debugging a memory sub-system with data transfer over a system management bus in accordance with some embodiments of the present disclosure.

FIG. 5 is a flow diagram of an example method of debugging a memory sub-system with data transfer over a system management bus in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by debug port address manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing logic receives a request to initialize a debug port address of SMBUS port 216. In one embodiment, debug port address manager 113 receives the request over PCIe bus 122 coupled between PCIe bus port 212 of memory sub-system 110 and host system 120.

At operation 510, the processing logic initializes the debug port address of SMBus port 216, such as slave address 246, in memory subsystem 110 for transfer of debug information. In one embodiment, debug port address manager 113 initializes the debug port address of SMBus port 216 by storing the debug port address in a slave address register associated with SMBus port 216. In one embodiment, the slave address register is stored in local memory 119 of memory sub-system controller 115. At operation 515, the processing logic sends confirmation of the initializing of the debug port address to host system 120.

At operation 520, the processing logic sends debug information to host system 120 from the debug port address over SMBus 124 coupled to SMBus port 216 of memory sub-system 110. In one embodiment, the debug information comprises at least one of runtime analytics, system state information, or health statistics of memory sub-system 110. In one embodiment, memory sub-system 110 can periodically, or in response to the occurrence of an event, provide the debugging information to host system 120 over SMBus 124 without being prompted by host system 120 (i.e., providing the information as part of a push operation). Upon receiving the debugging information, host system 120 can perform debugging operations or other analyses of memory sub-system 110.

Figure 6:
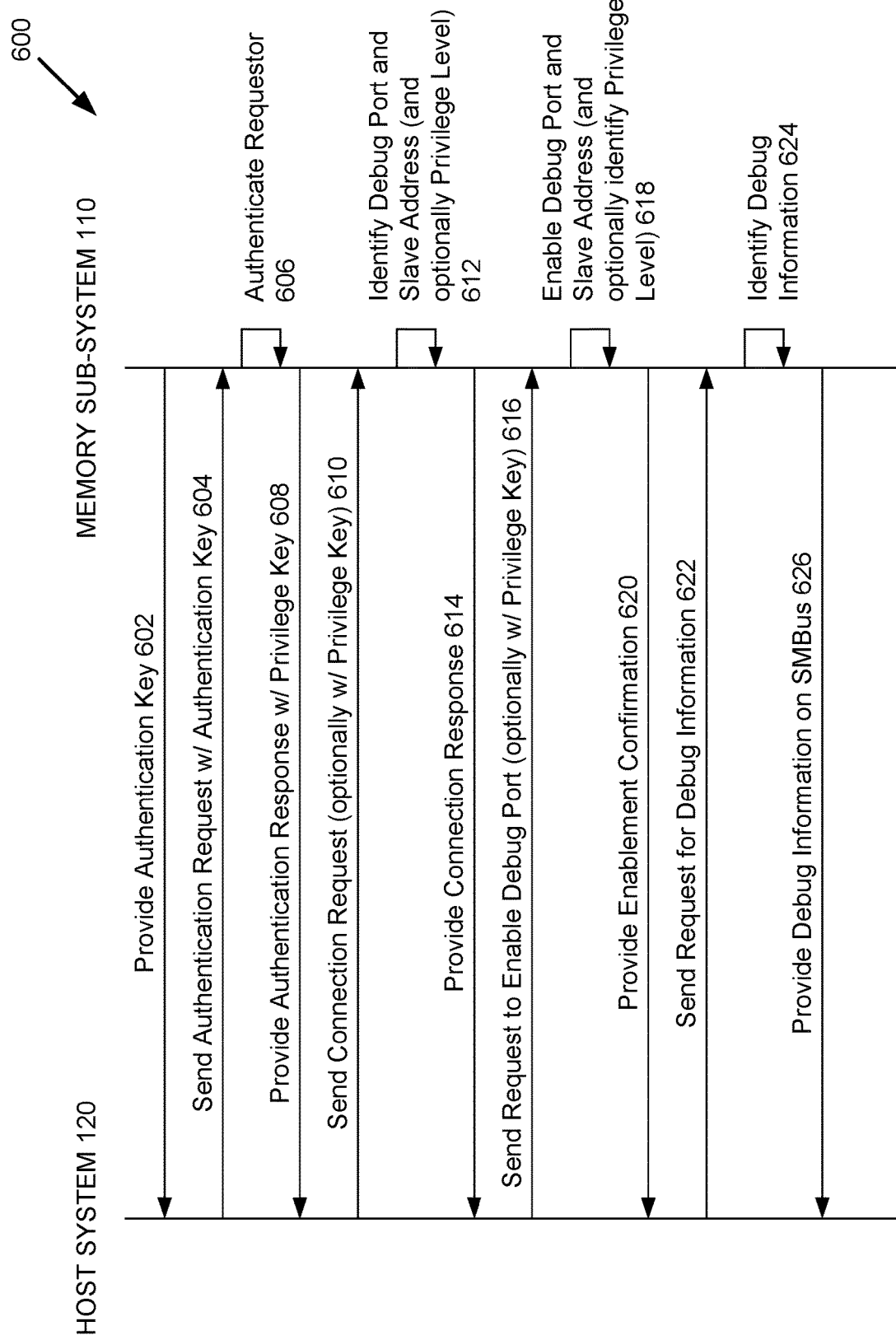
FIG. 6 is a sequence diagram illustrating secure authentication for debugging data transferred over a system management bus in accordance with some embodiments of the present disclosure.

FIG. 6 is a sequence diagram illustrating secure authentication for debugging data transferred over a system management bus in accordance with some embodiments of the present disclosure. The sequence diagram 600 illustrates one embodiment of authentication for a data exchange procedure performed between memory sub-system 110 and host system 120. At operation 602, memory sub-system 110 provides an authentication key to host system 120. In one embodiment, the authentication key is a private cryptographic key which can be used to create a digital signature used for authentication of host system 120. In another embodiment, host system 120 can receive the authentication key from some other entity besides memory sub-system 110, such as a certificate authority (not shown). At operation 604, host system 120 sends an authentication request to memory sub-system 110, including the previously received authentication key. For example, host system 120 can combine a message (e.g., the request) with the private key to create a digital signature on the message. In one embodiment, the authentication request is a general request to communicate with memory sub-system 110, such as to exchange NVMe communications over PCIe bus 122. At operation 606, memory sub-system 110 authenticates the requestor. In one embodiment, memory sub-system 110 maintains or receives a public key corresponding to the private key held by host system 120. Memory sub-system 110 can decrypt the digital signature using the public key to verify whether the signature was valid and created by the owner of the corresponding private (i.e., host system 120). In this manner, memory sub-system 110 ensures that only authenticated entities, such as host system 120, are granted access. At operation 608, memory sub-system 110 provides an authentication response to host system 120 including a privilege key. In one embodiment, the privilege key has an associated level of access (i.e., privilege level) to debug information associated with memory sub-system 110. The privilege key thus indicates the type/level/amount of debug information to which the corresponding host system 120 is entitled.

At operation 610, host system 120 sends a connection request to memory sub-system 110, including a request for a debug slave address 246 associated with SMBus port 216 of memory sub-system 110. In one embodiment, host system 120 sends a vendor specific command to memory sub-system 110 to request the debug slave address 246. Depending on the embodiment, this vendor specific command can be sent over PCIe bus 122, SMBus 124, or any other communication path coupling host system 120 to memory sub-system 110. In one embodiment, this connection request optionally includes the privilege key previously received from memory sub-system 110. At operation 612, memory sub-system 110 identifies the SMBus port 216 and corresponding debug slave address 246. Debug slave address 246 can be one of multiple slave address associated with SMBus port 216, and can be dedicated for use in transferring debug information to host system 120. In one embodiment, debug slave address 246 is a static (i.e., default) address defined by debug port address manager 113 of memory sub-system 110. In another embodiment, however, host system 120 can provide a suggested address along with the connection request indicating what address host system 120 would like to use for transfer of debug information. This suggested address can be within a range of available slave addresses provided by memory sub-system 110. If the connection request included the privilege key, memory sub-system 110 can further authenticate the privilege key and identify a level of access (i.e., a privilege level) associated with the privilege key. At operation 614, memory sub-system 110 provides a connection response including the identified debug slave address 246. In one embodiment, the connection response includes an indication of debug slave address 246 so that host system 120 will have the address available and can direct requests for debug information to that address. Debug port address manager 113 can recognize requests directed to the identified debug slave address 246 as requests for debug information and can distinguish those requests from others received over SMBus 124 and received at SMBus port 216. Depending on the embodiment, the connection response can be sent over PCIe bus 122, SMBus 124, or any other communication path coupling host system 120 to memory sub-system 110.

At operation 616, host system 120 sends a request to enable SMBus port 216 to receive a request for debug information directed to the debug slave address 246. In one embodiment, host system 120 sends a vendor specific command to memory sub-system 110 to request that debug slave address 246 be enabled (e.g., initialized). Depending on the embodiment, this vendor specific command can be sent over PCIe bus 122, SMBus 124, or any other communication path coupling host system 120 to memory sub-system 110. In one embodiment, if the privilege key was not previously provided with the connection request at operation 610, this enablement request optionally includes the privilege key previously received from memory sub-system 110. At operation 618, memory sub-system 110 enables SMBus port 216 to receive the request for debug information directed to the debug slave address 246. In one embodiment, in order to enable SMBus port 216 to receive the request for debug information, memory sub-system can stores the debug slave address 246 in a slave address register associated with SMBus port 216. Debug slave address 246 can be one of several slave addresses found in the register, the presence of each of which indicates that those slave addresses are enabled to receive messages, commands, or other data sent over SMBus 124 to SMBus port 216. If the enablement request included the privilege key, memory sub-system 110 can further authenticate the privilege key and identify a level of access (i.e., a privilege level) associated with the privilege key. At operation 620, memory sub-system 110 provides a confirmation of the enabling. The confirmation indicates to host system 120 that the debug slave address 246 was successfully enabled so that host system 120 can knowingly send requests for debug information directed to the debug slave address 246 over SMBus 124.

At operation 622, host system 120 sends a request for debug information directed to the debug slave address 246. In one embodiment, host system 120 sends the request over SMBus 124 and directed to debug slave address 246. The request is received at SMBus port 216, and debug port address manager 113 can identify the request as a request for debug information on the basis of it being directed to debug slave address 246. Depending on the embodiment, the request can be a request for one or more specific types of debug information, or can be more generally for any debug information that is available from memory sub-system 110. At operation 624, memory sub-system 110 identifies the requested debug information. Depending on the implementation, the debug information can include runtime analytics, system state information, health statistics, or other information pertaining to the memory sub-system 110. In one embodiment, debug port address manager 113 monitors operations of memory sub-system 110 and records the metadata in a corresponding data store. In another embodiment, debug port address manager 113 retrieves the requested debug information from the data store, where it was previously recorded by the same or some other component of memory sub-system 110. If the request received at operation 314 specifies a particular piece or type of debug information, debug port address manager 113 can determine whether the specific debug information is permitted by the level of access associated with the privilege key, and if so, identify the corresponding piece or type. If the request is not specific, debug port address manager 113 can identify available debug information corresponding to the level of access associated with the privilege key. At operation 626, memory sub-system 110 sends the debug information to host system 120 over SMBus 124 coupled to the SMBus port 216 of the memory sub-system 110. By utilizing SMBus 124 to transfer the debugging information, bandwidth in the PCIe bus 122 is conserved and physical access to the memory sub-system 110, such as in order to connect a UART bus, is not required, since the connection to host system 12 via the SMBus 124 is already existing. In one embodiment, additional requests for debug information can be received and the requested debug information can be provided to host system 120 via SMBus 124 as long as the debug slave address 246 remains enabled.

Figure 7:
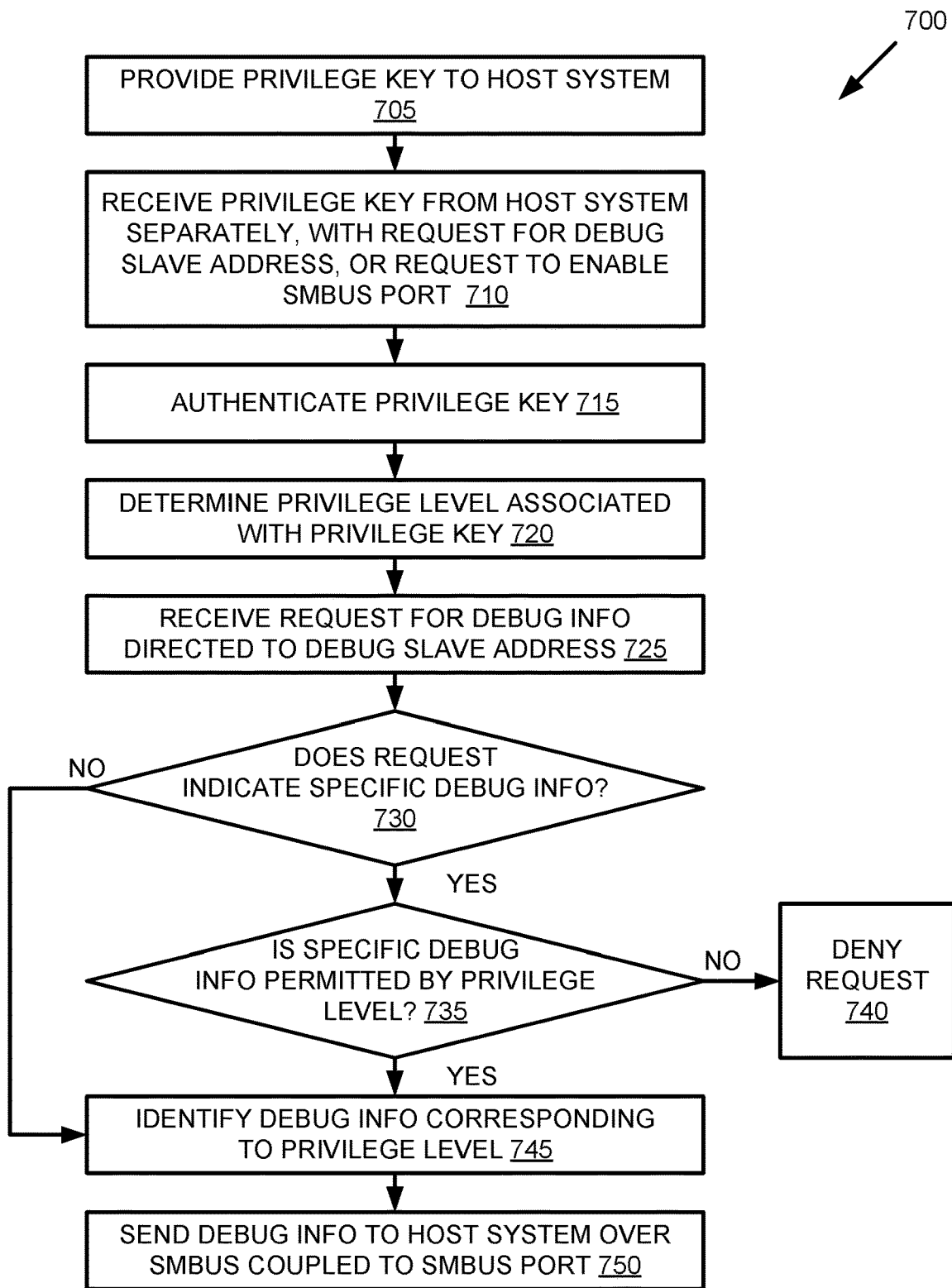
FIG. 7 is a flow diagram of an example method of secure authentication for debugging data transferred over a system management bus in accordance with some embodiments of the present disclosure.

FIG. 7 is a flow diagram of an example method of secure authentication for debugging data transferred over a system management bus in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by debug port address manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 705, the processing logic provides a privilege key to host system 120. In one embodiment, the privilege key has an associated level of access (i.e., privilege level) to debug information associated with memory sub-system 110. The privilege key thus indicates the type/level/amount of debug information to which the corresponding host system 120 is entitled.

At operation 710, the processing logic receives a privilege key from host system 120. Depending on the embodiment, the privilege key can be received with a request for a debug slave address 246 associated with a system management bus port 216 of memory sub-system 110, received with a request to enable the system management bus port 216 to receive a request for debug information directed to the debug slave address 246, received with some other message, or received separately from any other message.

At operation 715, the processing logic authenticates the received privilege key to verify the privilege level of the sender (i.e., host system 120). In one embodiment, the privilege key is part of a symmetric key encryption scheme used to verify the identity and privilege level of host system 120. For example, memory sub-system 110 may use a secure hash algorithm (e.g., SHA-x) to compute a hash of the received privilege key and compare that computed hash to a corresponding hash of one or more keys stored by memory sub-system, where each of the one or more keys has a corresponding privilege level. At operation 720, the processing logic determines the level of access associated with the received privilege key. Depending on which hash of the one or more keys stored by the memory sub-system 110 the computed hash of the received privilege key matches, the processing logic can determine the associated level of access. For example, if the hash of the received privilege key matches that of a privilege key associated with a first level of access (i.e., P0), the processing logic can determine that the host system 120 which provided the privilege key has that first level of access to the debug information associated with memory sub-system 110. Similarly, if the hash of the received privilege key matches that of a privilege key associated with a second level of access (i.e., P1), the processing logic can determine that the host system 120 which provided the privilege key has that second level of access to the debug information associated with memory sub-system 110.

At operation 725, the processing logic receives, from host system 120, a request for debug information directed to debug slave address 246. In one embodiment, memory sub-system 110 receives the request from host system over SMBus 124. The request is received at SMBus port 216, and debug port address manager 113 can identify the request as a request for debug information on the basis of it being directed to debug slave address 246 rather than one of the other slave addresses associated with SMBus port 216. At operation 730, the processing logic determines whether the request for debug information indicates specific debug information. In one embodiment, the request is for one or more specific types of debug information. For example, the request might specifically ask for one or more of runtime analytics, system state information, or health statistics of memory sub-system 110, might ask for debug information pertaining to a specific component of memory sub-system 110 or from a specific time period, etc. In another embodiment, the request is generally for any debug information that is available from memory sub-system 110.

Figure 8:
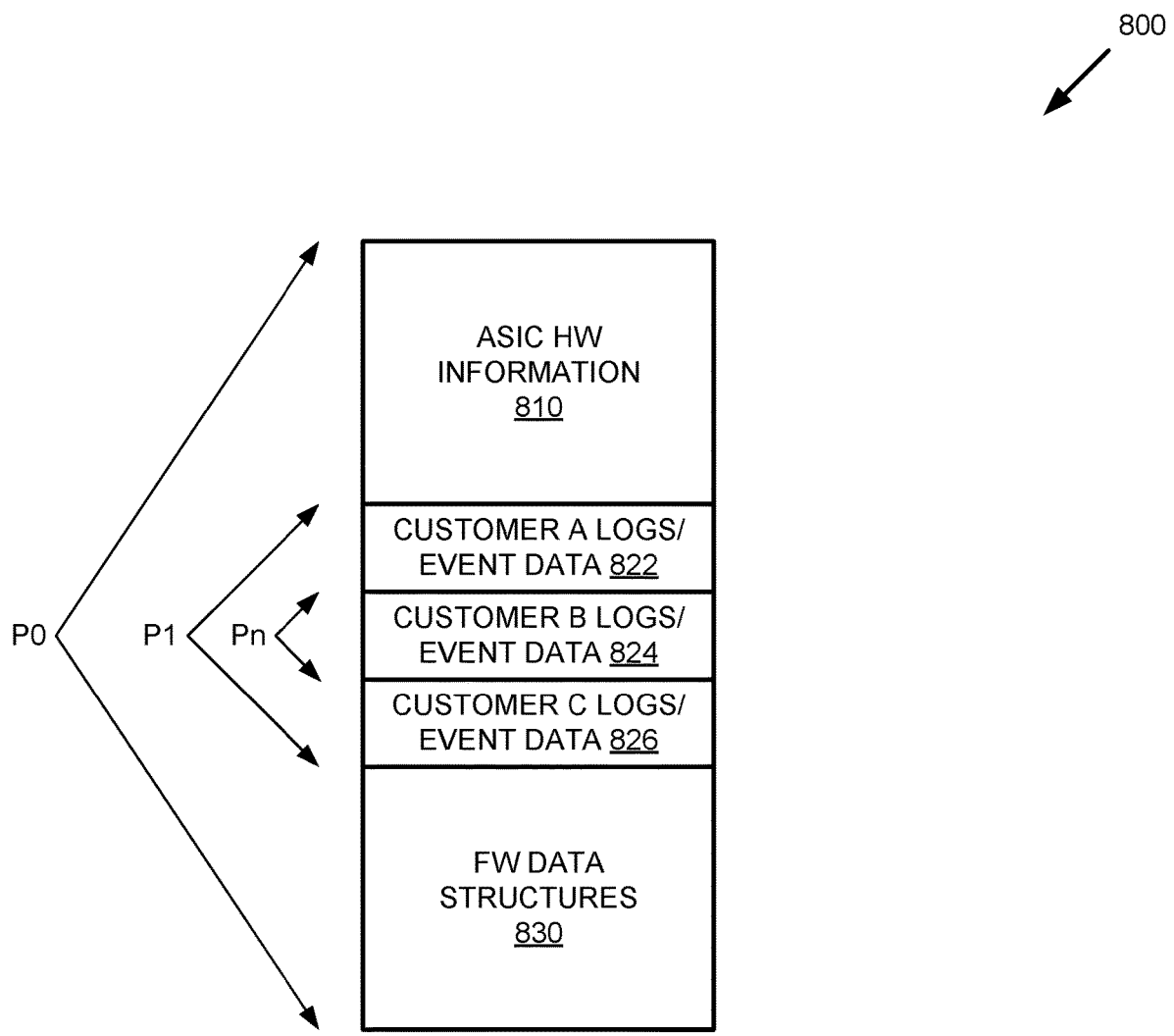
FIG. 8 is a block diagram illustrating the debugging data available to different levels of access associated with different privilege keys in accordance with some embodiments of the present disclosure.

Responsive to the request for debug information indicating specific debug information, At operation 735, the processing logic determines whether the specific debug information is permitted by the level of access associated with the privilege key and determined at operation 720. The different levels of access authorize the requesting host system to receive different types/levels/amounts of debugging information. FIG. 8 is a block diagram illustrating the debugging data available to different levels of access associated with different privilege keys in accordance with some embodiments of the present disclosure. In one embodiment, the diagram 800 illustrates a number of different privilege levels P0, P1, . . . Pn. Depending on the embodiment, any number of different privilege levels can be defined. Each privilege level can have rules that define types/levels/amounts of debugging information that host systems corresponding to each privilege level can receive. A first privilege level P0, for example, can be the highest privilege level and can grant associated host systems access to all available debugging information, such as ASIC hardware information 810, customer logs and event data 822-826, firmware data structures 830, and any other available debugging information. A second privilege level P1, for example, can be a more restricted privilege level and can grant associated host systems access to a subset of available debugging information, such as just the customer logs and event data 822-826. Another privilege level Pn, for example, can be the most restricted privilege level and can grant associated host system access only to limited debugging information, such as customer-specific logs and event data 824. Depending on the embodiment, the rules can define any different combination of type/level/amount of debugging information permitted by any of the different privilege levels. Thus, referring again to operation 735, the processing logic can compare the specific request to one or more rules associated with the associated level of access to determine whether the request is permitted. If the specific debug information is not permitted by the level of access associated with the privilege key, at operation 740, the processing logic denies the request for debug information.

If the specific debug information is permitted by the level of access associated with the privilege key or if the request does not indicate specific debug information, at operation 745, the processing logic identifies the debug information corresponding to the level of access associated with the privilege key. Depending on the implementation, the debug information can include runtime analytics, system state information, health statistics, or other information pertaining to the memory sub-system 110. At operation 750, the processing logic sends the debug information to host system 120 over SMBus 124 coupled to SMBus port 216 of the memory sub-system 110. In one embodiment, additional requests for debug information can be received and the requested debug information can be provided to host system 120 via SMBus 124 as long as the debug slave address 246 remains enabled.

Figure 9:
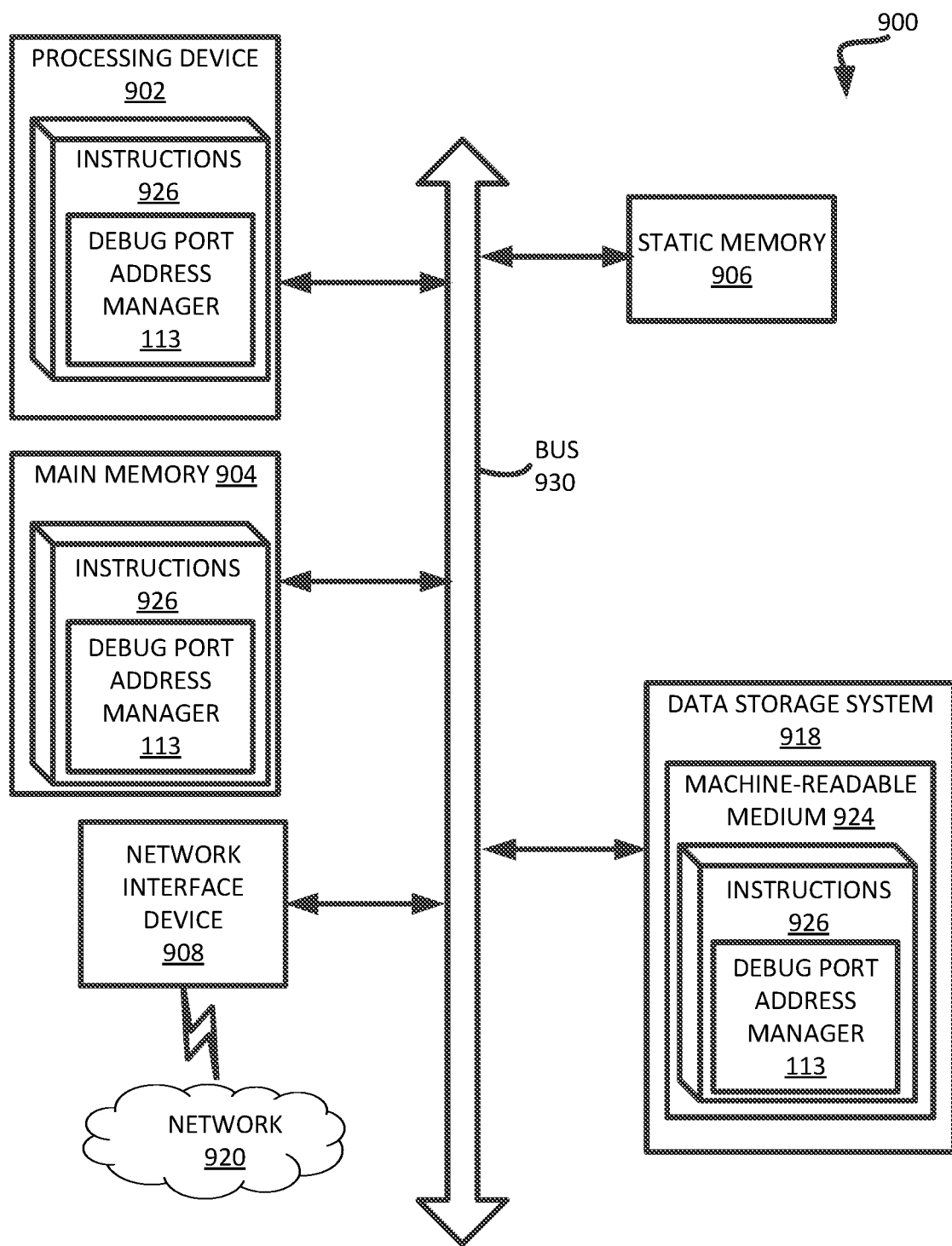
FIG. 9 is a block diagram of an example computer system in which embodiments of the present disclosure may operate.

FIG. 9 illustrates an example machine of a computer system 900 within which a set of instructions, for causing the machine to perform any one or more of the methodologies discussed herein, can be executed. In some embodiments, the computer system 900 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the debug port address manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage system 918, which communicate with each other via a bus 930.

Processing device 902 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein. The computer system 900 can further include a network interface device 908 to communicate over the network 920.

The data storage system 918 can include a machine-readable storage medium 924 (also known as a computer-readable medium) on which is stored one or more sets of instructions 926 or software embodying any one or more of the methodologies or functions described herein. The instructions 926 can also reside, completely or at least partially, within the main memory 904 and/or within the processing device 902 during execution thereof by the computer system 900, the main memory 904 and the processing device 902 also constituting machine-readable storage media. The machine-readable storage medium 924, data storage system 918, and/or main memory 904 can correspond to the memory sub-system 110 of FIG. 1.

In one embodiment, the instructions 926 include instructions to implement functionality corresponding to the debug port address manager 113 of FIG. 1). While the machine-readable storage medium 924 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
receiving a privilege key from a host system, the privilege key having an associated level of access to debug information associated with the memory device;
determining the level of access associated with the privilege key;
receiving, from the host system, a request for the debug information at a system management bus port of the memory sub-system, wherein a plurality of slave addresses are associated with the system management bus port, and wherein the request is directed to a debug slave address of the plurality of slave addresses associated with the system management bus port;
identifying the debug information corresponding to the level of access associated with the privilege key; and
sending the debug information to the host system over a system management bus coupled to the system management bus port of the memory sub-system.

2. The system of claim 1, wherein the processing device to perform further operations comprising:
receiving, from the host system, a request for the debug slave address associated with the system management bus port of the memory sub-system, wherein the privilege key is received with the request for the debug slave address; and
sending a response comprising the debug slave address to the host system.

3. The system of claim 1, wherein the processing device to perform further operations comprising:
receiving, from the host system, a request to enable the system management bus port to receive the request for debug information directed to the debug slave address, wherein the privilege key is received with the request to enable the system management bus port;
enabling the system management bus port to receive the request for debug information directed to the debug slave address responsive to the request to enable the system management bus port; and
sending confirmation of the enabling to the host system.

4. The system of claim 1, wherein the processing device to perform further operations comprising:
authenticating the privilege key.

5. The system of claim 1, wherein the processing device to perform further operations comprising:
determining whether the request for debug information indicates specific debug information; and
responsive to the request for debug information indicating specific debug information, determining whether the specific debug information is permitted by the level of access associated with the privilege key.

6. The system of claim 5, wherein the processing device to perform further operations comprising:
responsive to the specific debug information being permitted by the level of access associated with the privilege key, sending the specific debug information to the host system over the system management bus.

7. The system of claim 5, wherein the processing device to perform further operations comprising:
responsive to the specific debug information not being permitted by the level of access associated with the privilege key, denying the request for debug information.

8. The system of claim 1, wherein the debug information comprises at least one of runtime analytics, system state information, or health statistics of the memory sub-system.

9. A method comprising:
receiving, from a host system, a request for debug information associated with a memory sub-system and a privilege key associated with the host system, wherein the request for debug information is directed to a debug slave address of a plurality of slave addresses associated with a system management bus port of the memory sub-system;
determining whether host system is permitted to receive the debug information based on a level of access associated with the host system, wherein the level of access is defined by the received privilege key; and
responsive to the host system being permitted to receive the debug information, sending the debug information to the host system.

10. The method of claim 9, wherein sending the debug information to the host system comprises sending the debug information to the host system over a system management bus coupled to the system management bus port of the memory sub-system.

11. The method of claim 9, further comprising:
determining whether the request for debug information indicates specific debug information; and
responsive to the request for debug information indicating specific debug information, determining whether the specific debug information is permitted by the level of access associated with the privilege key.

12. The method of claim 9, further comprising:
identifying the debug information corresponding to the privilege level, wherein the debug information comprises at least one of runtime analytics, system state information, or health statistics of the memory sub-system.

13. A non-transitory computer-readable storage medium comprising instructions that, when executed by a processing device, cause the processing device to perform operations comprising:
receiving a privilege key from a host system, the privilege key having an associated level of access to debug information associated with the memory device;
determining the level of access associated with the privilege key;
receiving, from the host system, a request for the debug information at a system management bus port of the memory sub-system, wherein a plurality of slave addresses are associated with the system management bus port, and wherein the request is directed to a debug slave address of the plurality of slave addresses associated with the system management bus port;
identifying the debug information corresponding to the level of access associated with the privilege key; and
sending the debug information to the host system over a system management bus coupled to the system management bus port of the memory sub-system.

14. The non-transitory computer-readable storage medium of claim 13, wherein the instructions to cause the processing device to perform further operations comprising:
   receiving, from the host system, a request for the debug slave address associated with the system management bus port of the memory sub-system, wherein the privilege key is received with the request for the debug slave address; and
   sending a response comprising the debug slave address to the host system.

15. The non-transitory computer-readable storage medium of claim 13, wherein the instructions to cause the processing device to perform further operations comprising:
   receiving, from the host system, a request to enable the system management bus port to receive the request for debug information directed to the debug slave address, wherein the privilege key is received with the request to enable the system management bus port;
   enabling the system management bus port to receive the request for debug information directed to the debug slave address responsive to the request to enable the system management bus port; and
   sending confirmation of the enabling to the host system.

16. The non-transitory computer-readable storage medium of claim 13, wherein the instructions to cause the processing device to perform further operations comprising:
   authenticating the privilege key.

17. The non-transitory computer-readable storage medium of claim 13, wherein the instructions to cause the processing device to perform further operations comprising:
   determining whether the request for debug information indicates specific debug information; and
   responsive to the request for debug information indicating specific debug information, determining whether the specific debug information is permitted by the level of access associated with the privilege key.

18. The non-transitory computer-readable storage medium of claim 17, wherein the instructions to cause the processing device to perform further operations comprising:
   responsive to the specific debug information being permitted by the level of access associated with the privilege key, sending the specific debug information to the host system over the system management bus.

19. The non-transitory computer-readable storage medium of claim 17, wherein the instructions to cause the processing device to perform further operations comprising:
   responsive to the specific debug information not being permitted by the level of access associated with the privilege key, denying the request for debug information.

20. The non-transitory computer-readable storage medium of claim 13, wherein the debug information comprises at least one of runtime analytics, system state information, or health statistics of the memory sub-system.

* * * * *